United States Patent
Riebling

[15] 3,650,474
[45] Mar. 21, 1972

[54] BIPROPELLANT INJECTOR
[72] Inventor: Robert W. Riebling, LaCanada, Calif.
[73] Assignee: James E. Webb, Administrator of the National Aeronautics and Space Administration
[22] Filed: Sept. 25, 1967
[21] Appl. No.: 670,829

[52] U.S. Cl. .............................. 239/418, 239/433, 239/543
[51] Int. Cl. ........................................................ F23d 11/10
[58] Field of Search .................. 239/418, 420, 426, 433, 434; 60/258

[56] References Cited

UNITED STATES PATENTS 1,321,816  11/1919  Foerst .................................. 239/426
1,366,685  1/1921  Wilson .................................. 239/434

*Primary Examiner*—Samuel Feinberg
*Attorney*—G. T. McCoy, J. H. Warden and D. E. Leslie

[57] ABSTRACT

A bipropellant injector consisting of a pair of concave deflector blocks with their concave surfaces facing one another. The concave surfaces diverge downwardly with a fixed spaced relationship between them at the base of the injector. A triangular "shute" is formed in each concave surface, by a pair of diverging sidewalls. The two shutes are opposite one another. A circular orifice is located at the apex of each shute to provide an inlet for propellant, such as fuel or oxidizer to enter the inject..r. Propellant, forced through each orifice as a circular jet, is directed downwardly along the shute spreading out against the concave shute surface. The propellant spreads to form a sheet which is limited between the shute's sidewalls. It finally clears the shute's lower edge, and mixes with the propellant flowing from the opposite shute along the centerline of the space between the injector's blocks.

8 Claims, 3 Drawing Figures

PATENTED MAR 21 1972          3,650,474
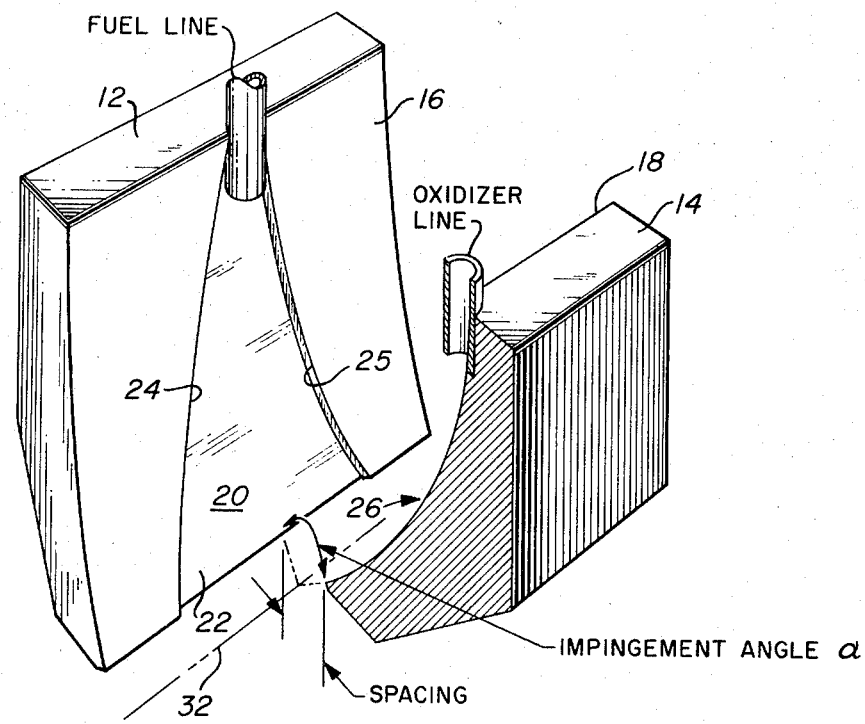
Figure 2.
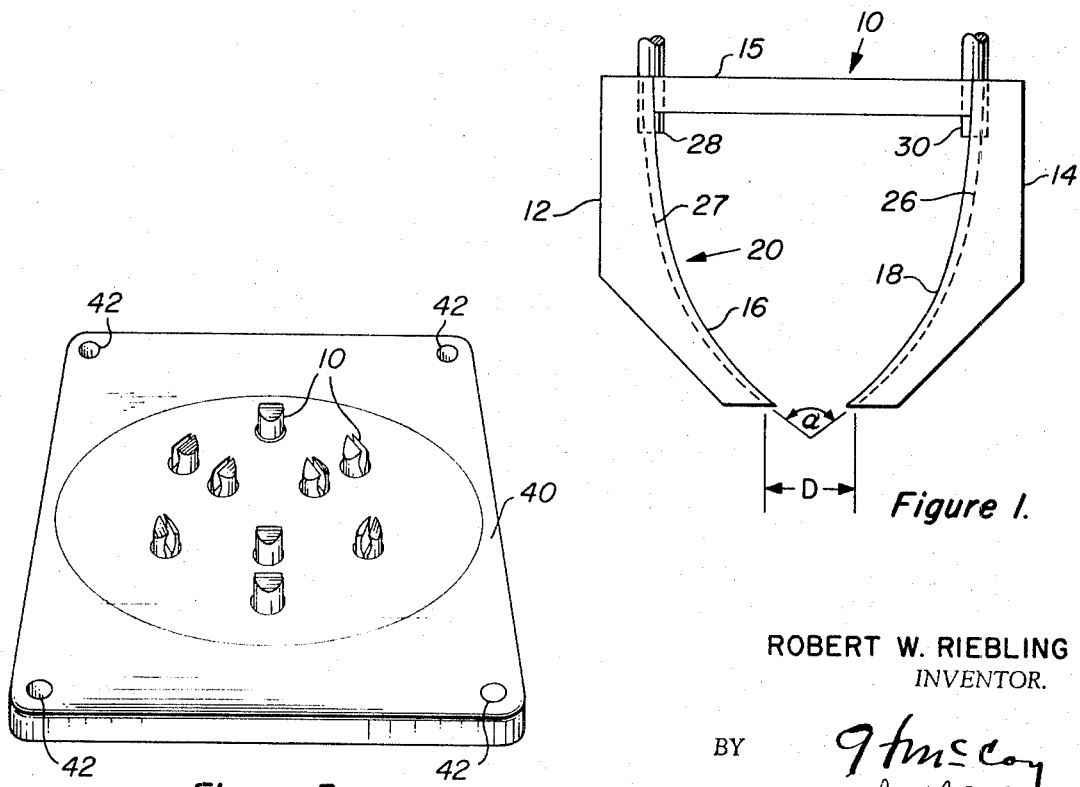
Figure 1.
Figure 3.
ROBERT W. RIEBLING
INVENTOR.
BY
J H McCoy
J. H. Warden
ATTORNEYS.

BIPROPELLANT INJECTOR

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

1. Field of the Invention

This invention relates to a propellant mixing device and, more particularly, to an improved bipropellant injector.

2. Description of the Prior Art

Since the early development of bipropellant rocket engines various injecting arrangements have been conceived. The basic function of a bipropellant injector is to control the uniform mixing of the two propellants which are supplied from two separate sources, so that satisfactory combustion occurs. To this end impinging-sheet elements, generally with concave surfaces, have been used to convert jets of propellants from circular orifices into thin liquid sheets to enhance the uniform mixing of the propellants. These elements are sometimes referred to as concave deflectors.

It has been observed that although the use of impinging-sheet elements or concave deflectors in injectors is quite useful, such use results in certain phenomena which are most detrimental to the effectiveness of the injector, particularly to the uniform mixing of the two propellants. It has been observed that when a jet of propellant or liquid from a circular orifice is directed tangentially against a solid concave deflector surface, the liquid, while spreading into the form of a sheet, develops surface tension wavelets which often produce the following undesired effects:

1. Upon interaction of the wavelets with the free boundary of the sheet of liquid on the deflector, they tend to form "daughter droplets" in much the same manner as spray is formed from ocean waves. These droplets are continuously cast off from the main sheet of liquid and form large globules which then dribble off the deflector in an unpredictable manner, resulting a nonuniform propellant mixing. Consequently, this portion of the propellant would be ineffectively combusted and might cause combustion roughness.
2. The wavelets can persist in the free unbounded sheet of liquid propellant flowing on the deflector surface and upon the interaction with the outer peripheral portion or "ribs" of the liquid at the edge of the sheet could bring about a premature liquid sheet disintegration.

Such undesirable phenomena have characterized the performance of all known prior art bipropellant injectors, thereby limiting their effectiveness.

OBJECTS AND SUMMARY OF THE INVENTION

It is therefore a primary object of the present invention to provide an improved bipropellant injector.

Another object of this invention is to provide a bipropellant injector in which the number of surface tension wavelets and their undesired effect is minimized.

A further object of this invention is the provision of a bipropellant injector which produces a more uniform mixing of the propellants, than that attainable with similar prior art injectors.

Still a further object of this invention is to provide an improved bipropellant injector in which the flow of propellant is controlled to minimize the number of spray-producing droplets.

These and other object of the invention are achieved by providing a bipropellant injector which includes oppositely positioned and spaced apart bounded concave surfaces. Jets of liquid propellants from circular orifices are directed onto these surfaces. Since the concave surfaces are bounded, actually defining triangular shutes with concave surfaces, the sheets of liquid which are formed in the shutes are bounded by the shutes' sidewalls. Consequently fewer spray-producing droplets are created. Furthermore since the sheets of liquids have definite boundaries, the surface tension wavelets cannot persist along the liquid sheet boundaries to produce undesired premature liquid sheet disintegration. Since the injector of the present invention is used for mixing propellants in liquid state, the terms propellant and liquid as used hereafter should be regarded as synonyms.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 1 is a side view of the improved bipropellant injector of the present invention;

FIG. 2 is an isometric view of one of the injector's deflectors and a partial view of the other deflector; and FIG. 3 is an isometric view of a plurality of injectors mounted on a common plate.

DESCRIPTION OF THE PREFERRED EMBODIMENTS

Referring to FIGS. 1 and 2 there may be seen an injector 10 which consists of two deflector blocks 12 and 14. In FIG. 1 they are shown interconnected at their tops by a header 15. The header is not shown in FIG. 2 in order to display significant novel features of the injector. The deflector blocks, or simply deflectors 12 and 14 are positioned so that their respective surfaces 16 and 18 face one another in a parallel relationship. Surface 16 is machined to define a triangular shute 20 which has a concave surface 22 and two sidewalls 24 and 25. Similarly, surface 18 of deflector 14 defines an identical shute, designated in the figures by numeral 26. The bases of the the two shutes which are at the base of the injector 10 are parallel to one another and spaced apart by a distance D.

A circular orifice 28 is fixedly positioned at the apex of shute 20 while a similar circular orifice 30 is fixedly positioned at the apex of the shute 26. As is appreciated by those familiar with the art, the function of these orifices is to serve as inlets for the two liquids into the injector in which they are to be mixed. In FIG. 2 the liquids are designated FUEL and OXIDIZER, assumed to be supplied from appropriate sources (not shown).

In operation the fuel is forced into the injector through orifice 28 and the oxidizer through orifice 30. The circular jets of fuel and oxidizer issuing from 28 and 30 are directed tangentially downward along the concave surfaces of shutes 20 and 26. Since the shutes are triangular, the liquids spread out within the shutes against the shutes' sidewalls (such as 24 and 25 of shute 20). As a result, the jets of liquid tend to flatten out into even thinner and wider sheets until they clear the lower edges of the shutes. The two sheets of liquid generally impinge along a line 32 at the center of spacing D. Thereat uniform fuel-oxidizer mixture occurs, starting the desired combustion. The angle of impingement $\alpha$ is a function of the curvature of the concave surfaces of the two shutes, at the lower ends which define the injector's outlet.

The circular jet of liquid, issuing from each orifice, does not merely impinge a concave surface in order to be converted into a sheet of liquid. Rather it is issued into a shute which in addition to a concave surface has two sidewalls or boundaries. Consequently, the formed sheet of liquid is bounded by the sidewalls, which contribute to the elimination or minimization of undesired phenomena which occur in prior art injectors.

Basically, by providing the sidewalls along each shute the sheet of liquid flowing on the concave surface thereof has a solid boundary, eliminating the formation of a liquid-gas interface which is created when the sheet of liquid is formed on an unbounded surface. This minimizes the formation of "- daughter droplets" and the undesired effects produced thereby. Furthermore, by directing the sheet of liquid in a bounded shute, surface tension wavelets are delfected by the shute's sidewalls into the flowing sheet of liquid, thus acting to effectively cancel the surface tension wavelets.

Reference is now made to FIG. 3 where the bottom sides of a plurality of injectors are shown. The injectors are shown supported on a plate 40. Holes 42 are used to accommodate bolts (not shown) by means of which the plate 40 is secured to an engine or the like. Two liquids such as fuel and oxidizer are assumed to be supplied to each injector 10 with the mixtures produced by the various injectors used to provide the required energy-producing combustion. In FIGS. 1 and 2, the entire surfaces 16 and 18 of the deflectors are shown as concave. This may be desirable to simplify the machining of the bottom surfaces (such as 22) of the shutes. However, for the proper performance of the injector of the present invention, it should be appreciated that only the bottom surfaces of the shutes have to be curved, since the flow of liquid is limited to such surfaces. It should further be pointed out that the divergence of the sidewalls of each shute has to be such that for any expected flow rate of liquid the sheet of liquid formed in the shute is at all times bound by the sidewalls of the shute.

There has accordingly been shown and described herein a novel bipropellant injector which includes shutes, formed by curved bottom surfaces and boundary-defining sidewalls. The shutes convert jets of liquid into sheets of liquid, solidly bounded by the shutes' sidewalls to minimize the formation of spray-producing droplets and the effects of surface tension wavelets. It is appreciated that those familiar with the art may make modifications and/or substitute equivalents in the arrangement as shown without departing from the spirit of the invention. Therefore, all such modifications and/or equivalents are deemed to fall within the scope of the invention as claimed in the appended claims.

I claim:

1. An injector for mixing two liquids supplied thereto comprising:

a first shute having a bottom surface uniformly curving from a top end thereof to an opposite bottom end, and a pair of sidewalls on opposite sides of said surface, the walls diverging from one another from said top to the bottom ends of said surface, the curved surface between the sidewalls at said top end defining a shute apex and the curved surface between the sidewalls at the bottom end defining a shute base, one of said liquids being injectable at the shute apex;

a second shute having a bottom surface uniformly curving from a top end thereof to an opposite bottom end, and a pair of sidewalls on opposite sides of said surface, the walls diverging from one another from said top to the bottom ends of said surface, the curved surface between the sidewalls at said top end defining a shute apex and the curved surface between the sidewalls at the bottom end defining a shute base, the other of said two liquids being injectable at the shute apex; and means for fixedly positioning the first and second shutes opposite one another with their bases in parallel spaced relationship, the space therebetween defining the outlet of said injector with the distance between the bases being less than the distance between the apexes of said shutes.

2. The injector as recited in claim 1 wherein said means for injecting comprise first liquid inlet means fixedly positioned at the apex of said first shute and defining a first orifice through which a jet of liquid is injectable into said first shute, said means for injecting further comprising a second liquid inlet means fixedly positioned at the apex of said second shute and defining a second orifice through which a jet of liquid is injectable into said second shute, whereby the liquids injected in said first and second liquid inlet means are combinable only in the space defining the injector outlet.

3. An injector for mixing two fluids supplied thereto comprising:

first and second deflecting blocks fixed opposite one another at a spaced apart relationship, each block defining a shute in the surface opposite the other block, said shute having a bottom of a continuous preselected curvature extending from a first end of the block to a second opposite end, said shute further comprising a pair of sidewalls diverging from said first end to the second end, the spacing between the bottoms of the shutes at said first ends being greater than the spacing between the shutes' bottoms at said second ends; and a pair of fluid injecting means positioned at the apexes of the shutes defined in said first and second blocks for injecting jets of fluid into said shutes at the apexes thereof, whereby the fluid in each shute flows from the shute apex towards the other shute end over said curved bottom, the fluid spreading out to form a sheet of fluid physically bound by the sidewalls of said shutes.

4. An injector for controlling the uniform mixing of two liquids supplied thereto comprising:

a pair of oppositely positioned liquid-flow-controlling shutes, each shute having a uniformly curving bottom surface and two sidewalls diverging from one another from one end of said shute, defining a shute apex, towards an opposite end, defining a shute base, the bases of said shutes being parallel and spaced apart from one another to define an injector outlet, the outlet width defined by the distance between the bases being less than the distance between the shutes' apexes; and two liquid inlet means, each one positioned at the apex of a different one of said shutes to provide means for injecting one of said two liquids into the shute, with the liquids exiting the shutes' bases being uniformly mixable substantially along the center of said injector outlet.

5. The injector as recited in claim 4 wherein each of said liquid inlet means defines a circular orifice, whereby the liquid injected into the shute is in the form of a circular jet of liquid, spreading out against the bottom surface of the shute and forming a liquid-solid boundary with the shute's sidewalls.

6. The injector as recited in claim 5 wherein the bottom surface of each shute is concave with the curvatures of the two surfaces at the shute's bases defining an impingement angle at which the liquids, exiting the shutes, are combined.

7. The injector as recited in claim 4 wherein the bottom surface of each shute is concave with the curvatures of the two surfaces at the shute's bases defining an impingement angle at which the liquids, exiting the shutes, are combined.

8. An injector for controlling the uniform mixing of two liquids supplied thereto, comprising:

a pair of uniformly curved oppositely positioned shutes, converging towards one another from first ends thereof representing shutes' apexes at which said liquids are supplied to second ends thereof representing shutes' bases, the space between the bases defining an injector outlet, each shute having a uniform concave bottom surface extending from its apex to its base and a pair of sidewalls diverging from the apex to the base, whereby two different liquids supplied at the apexes of the shutes spread out therein to form sheets of liquid exiting said shutes' bases to be uniformly mixed at the injector outlet.

* * * * *